(12) United States Patent
Lee et al.

(10) Patent No.: US 7,557,159 B2
(45) Date of Patent: Jul. 7, 2009

(54) PLASTIC RESIN COMPOSITION HAVING IMPROVED HEAT RESISTANCE, WELD STRENGTH, CHEMICAL RESISTANCE, IMPACT STRENGTH, ELONGATION, AND WETTABILITY

(75) Inventors: Jaewook Lee, Anyang (KR); Seung Hun Chae, Daejeon (KR); Jaehyug Cha, Daejeon (KR); Seonglyong Kim, Daejeon (KR); Chanhong Lee, Daejeon (KR)

(73) Assignee: LG Chem, Ltd. (KR)

( * ) Notice: Subject to any disclaimer, the term of this patent is extended or adjusted under 35 U.S.C. 154(b) by 191 days.

(21) Appl. No.: 11/323,735

(22) Filed: Dec. 31, 2005

(65) Prior Publication Data

US 2006/0167179 A1    Jul. 27, 2006

(30) Foreign Application Priority Data

Dec. 31, 2004  (KR) ............... 10-2004-0117941
Dec. 29, 2005  (KR) ............... 10-2005-0132880

(51) Int. Cl.
C08L 51/04 (2006.01)
C08L 71/02 (2006.01)

(52) U.S. Cl. ............... 525/70; 525/71; 525/73; 525/83

(58) Field of Classification Search ............... 525/70, 525/71, 83, 73
See application file for complete search history.

(56) References Cited

U.S. PATENT DOCUMENTS

| | | | |
|---|---|---|---|
| 3,010,936 A | 11/1961 | Irvin | |
| 3,111,501 A | 11/1963 | Thompson | 260/45.5 |
| 3,652,726 A | 3/1972 | Nield et al. | 260/876 |
| 3,661,994 A * | 5/1972 | Hwa et al. | 525/71 |
| 4,567,233 A | 1/1986 | Tomono et al. | 525/71 |
| 4,987,185 A | 1/1991 | Aoki et al. | |
| 5,443,775 A * | 8/1995 | Brannon | 264/143 |
| 5,726,265 A | 3/1998 | Piejko et al. | 526/262 |
| 6,384,133 B1 | 5/2002 | Eichenauer | 525/64 |

FOREIGN PATENT DOCUMENTS

| | | | |
|---|---|---|---|
| CN | 1383444 A | | 12/2002 |
| CN | 2606027 Y | | 3/2004 |
| DE | 1931723 | * | 6/1969 |
| EP | 0204357 A1 | | 12/1986 |
| EP | 0 330 038 | | 8/1989 |
| EP | 0402528 A2 | | 12/1990 |
| EP | 0685524 A1 | | 12/1995 |
| EP | 1001307 A2 | | 5/2000 |
| JP | 7-252399 | | 10/1995 |
| JP | 07252399 | | 10/1995 |
| JP | 9-202848 | | 8/1997 |
| JP | 10279754 | | 10/1998 |
| JP | 2002530444 A | | 9/2002 |
| KR | 1995-0000196 | | 1/1995 |
| KR | 2003-0030420 | | 4/2003 |
| KR | 2003-0055445 | | 7/2003 |
| WO | 0029458 A1 | | 5/2000 |

OTHER PUBLICATIONS

Tanimura et al., CAPLUS AN 1970:1331749, 4-1970.*
Taiwan Preliminary Notice of First Office Action (with English Translation) dated Jun. 4, 2008 for Patent Application No. 094147550.
Chinese Office Action with English Translation dated Sep. 5, 2008 for Application No. 200680008446.2.
European Search Report dated Oct. 22, 2008, corresponding to application No. 05822357.9-2109/1831306; PCT Application No. PCT/KR2005004672.

* cited by examiner

*Primary Examiner*—Jeffrey C Mullis
(74) *Attorney, Agent, or Firm*—Cantor Colburn LLP

(57) ABSTRACT

Thermoplastic resin compositions are provided. A heat-resistant ABS thermoplastic resin composition including a graft ABS polymer, an α-methylstyrene copolymer, an imide-substituted copolymer, and an additive for improving elongation and impact strength is excellent in weld strength, chemical resistance, impact strength, and elongation. A thermoplastic resin composition including a graft ABS polymer, a α-methylstyrene copolymer, and an additive for improving wettability is excellent in weld strength and wettability.

13 Claims, No Drawings

PLASTIC RESIN COMPOSITION HAVING IMPROVED HEAT RESISTANCE, WELD STRENGTH, CHEMICAL RESISTANCE, IMPACT STRENGTH, ELONGATION, AND WETTABILITY

CROSS-REFERENCE TO RELATED PATENT APPLICATION

This application claims the benefit of Korean Patent Application No. 10-2004-0117941, filed on Dec. 31, 2004 and Korean Patent Application No. 10-2005-0132880, filed on Dec. 29, 2005, in the Korean Intellectual Property Office, the disclosures of which are incorporated herein in their entirety by reference.

BACKGROUND OF THE INVENTION

1. Field of the Invention

The present invention relates to a thermoplastic resin composition, and more particularly, to a heat-resistant acrylonitrile-butadiene-styrene (ABS) resin composition having improved weld strength, chemical resistance, impact strength, elongation, and wettablility.

2. Description of the Related Art

Generally, a heat-resistant acrylonitrile-butadiene-styrene (ABS) resin having excellent impact resistance, processability, chemical resistance, etc. has been used as interior and exterior materials for automobiles etc., and parts for electric and electronic equipments such as office appliances and home electric appliances. In the case of ABS used as interior and exterior materials for automobiles, a high performance heat-resistant resin having superior heat resistance and various post processing properties is required.

To give heat-resistance in the ABS resin, a method of preparing a heat-resistant ABS by mixing a heat-resistant copolymer with a graft ABS polymer has been widely used. That is, a method of preparing a heat-resistant ABS resin in which a partition or total amount of styrene used in the preparation of a heat-resistant copolymer is substituted with α-methyl styrene having good heat-resistance (U.S. Pat. No. 3,111,501), a method of preparing a heat-resistant ABS resin including an acryl amide compound (European Patent No. 0,330,038), etc. are known in the art.

According to U.S. Pat. No. 3,111,501, in the preparation of a heat-resistant ABS resin, a partition or total amount of styrene is substituted with α-methyl styrene having good heat-resistance. However, due to α-styrene having a lower reaction rate than other monomers, a large amount of monomers are remained, which results in low yield and poor impact strength and heat resistance. When better heat resistance is required for industrial use, an imide-substituted copolymer is blended to prepare the heat-resistant ABS resin. The heat-resistant ABS is prepared using N-phenylmaleimide in the preparation of a heat resistance enhancer (U.S. Pat. No. 4,567, 233) or using N-orthochlorophenylmaleimide or an allyl, alkyl, or cyclic substituent (U.S. Pat. Nos. 3,652,726 and 5,726,265). However, these methods have disadvantages of high manufacturing costs.

ABS is mixed with two materials described above, i.e., the heat-resistant copolymer and the imide-substituted copolymer considering heat resistance and cost effectiveness. When mixing the materials, compatibility between the two materials is poor, and thus impact strength and elongation are deteriorated.

The heat-resistant ABS used as interior and exterior materials for automobiles is often subjected to a postprocessing process. A representative example of the postprocessing process is a painting process. In the painting process, when a resin does not have an affinity for a chemical solvent, appearance defects such as pin holes and paint stains are caused. When chemical resistance of the resin is poor, paint cracks are produced.

Furthermore, when a resin does not have an affinity for a chemical solvent, the painting process should be performed several times, resulting in, in particular, waste of chemical solvents and discomfort to workers. In addition, a thick coating of chemical solvents leads to poor coating appearance after it is dried.

The thermoplastic resin composition used as, in particular, a material of automobile lamp housing requires good weld strength in addition to heat resistance and painting characteristics. The weld strength is a property required when a cross section of a molded article is heated to weld to the other molded article, thereby obtaining a final article. A welding surface of the molded article should be clear when separated from a hot plate. However, most rubber reinforced thermoplastic resin compositions conventionally used in the art produce a lot of stings in their welding surfaces when separated from a hot plate, which requires an additional process for removing strings and reduces productivity.

SUMMARY OF THE INVENTION

The present invention provides a thermoplastic resin composition having improved heat resistance, weld strength, chemical resistance, impact strength, and elongation.

The present invention also provides a thermoplastic resin composition having improved weld strength and wettability.

According to an aspect of the present invention, there is provided a thermoplastic resin composition including a graft ABS polymer, a α-methylstyrene copolymer, an imide-substituted copolymer, and an additive for improving elongation and impact strength.

The thermoplastic resin composition may include 20 to 40 parts by weight of a graft ABS polymer; 20 to 80 parts by weight of a α-methylstyrene copolymer; 10 to 30 parts by weight of an imide-substituted copolymer; and 1 to 10 parts by weight of an additive for improving elongation and impact strength.

The thermoplastic resin composition may include 20 to 40 parts by weight of a graft ABS polymer; 20 to 40 parts by weight of a α-methylstyrene copolymer; 10 to 30 parts by weight of an imide-substituted copolymer; and 1 to 10 parts by weight of an additive for improving elongation and impact strength.

The graft ABS polymer may be prepared by copolymerizing 10 to 40 parts by weight of a polybutadiene rubber latex (small particle-sized rubber latex) of which the average particle diameter is from 800 to 1,500 Å and the gel content is from 80 to 90%; 15 to 30 parts by weight of a polybutadiene rubber latex (large particle-sized rubber latex) of which the average particle diameter is from 2,500 to 3,500 Å and the gel content is from 80 to 90%; 15 to 30 parts by weight of aromatic vinyl compound; and 10 to 25 parts by weight of vinyl cyanide compound.

The aromatic vinyl compound may be selected from the group consisting of styrene, α-methylstyrene, and ρ-vinyltoluene.

The vinyl cyanide compound may be selected from the group consisting of acrylonitrile, methacrylonitrile, and ethacrylonitrile.

The α-methylstyrene may be prepared by copolymerizing α-methylstyrene and acrylonitrile.

The α-methylstyrene may be prepared by copolymerizing 50 to 80 parts by weight of α-methylstyrene and 20 to 50 parts by weight of acrylonitrile.

The additive for improving enlogation and impact strength may be a polymethylmethacrylate (PMMA) copolymer, a copolymer of styrene and maleic anhydride, or a copolymer of α-methylstyrene copolymer and maleic anhydride.

The PMMA copolymer may be selected from the group consisting of a graft copolymer of methylmethacrylate and glycidyl methacrylate (PMMA-g-GMA), a graft copolymer of methylmethacrylate and maleic anhydride (PMMA-g-MAH), a graft copolymer of methylmethacrylate and ethyl acrylate (PMMA-g-EA), and a graft copolymer of methylmethacrylate and vinyl acetate (PMMA-g-VA).

The thermoplastic resin composition may further include at least one additive selected from the group consisting of an antioxidant, a stabilizer, and a lubricant.

The content of an antioxidant may be 0.1 to 5 parts by weight, the content of a stabilizer may be 0.1 to 5 parts by weight, and the content of a lubricant may be 0.1 to 10 parts by weight based on 100 parts by weight of the thermoplastic resin composition.

According to another aspect of the present invention, there is provided a thermoplastic resin composition including a graft ABS polymer, a α-methylstyrene copolymer, and an additive for improving wettability.

The thermoplastic resin composition may include 20 to 40 parts by weight of a graft ABS polymer; 20 to 80 parts by weight of a α-methylstyrene copolymer; and 0.1 to 5 parts by weight of an additive for improving wettability.

The additive for improving wettability may be at least one selected from the group consisting of polypropyleneglycol, polyethyleneglycol, and a block copolymer thereof.

The additive for improving wettability may have a weight average molecular weight of 500 to 5,000.

The thermoplastic resin composition may further include an imide-substituted copolymer and an additive for improving elongation and impact strength.

The thermoplastic resin composition may include 20 to 40 parts by weight of a graft ABS polymer; 20 to 40 parts by weight of a α-methylstyrene copolymer; 10 to 30 parts by weight of an imide-substituted copolymer; 1 to 10 parts by weight of an additive for improving elongation and impact strength; and 0.1 to 5 parts by weight of an additive for improving wettability.

DETAILED DESCRIPTION OF THE INVENTION

The present invention will be described in detail as follows.

A thermoplastic resin composition according to an embodiment of the present invention includes a graft ABS polymer, an α-methylstyrene copolymer, an imide-substituted copolymer, and an additive for improving elongation and impact strength and has excellent heat resistance, weld strength, chemical resistance, impact strength, and elongation.

Preferably, the thermoplastic resin composition includes 20 to 40 parts by weight of a graft ABS polymer; 20 to 80 parts by weight of an α-methylstyrene copolymer; 10 to 30 parts by weight of an imide-substituted copolymer; and 1 to 10 parts by weight of an additive for improving elongation and impact strength.

More preferably, the thermoplastic resin composition includes 20 to 40 parts by weight of a graft ABS polymer; 20 to 40 parts by weight of an α-methylstyrene copolymer; 10 to 30 parts by weight of an imide-substituted copolymer; and 1 to 10 parts by weight of an additive for improving elongation and impact strength.

The content of the α-methylstyrene copolymer may be 50 to 400 parts by weight based on 100 parts by weight of the graft ABS polymer. When the content of the α-methylstyrene copolymer is less than 50 parts by weight, impact strength, elongation, or chemical resistance are poor. When the content of the α-methylstyrene copolymer is greater than 400 parts by weight, tensile strength, heat resistance, flowability, and gloss are poor.

The content of the imide-substituted copolymer may be 25 to 150 parts by weight based on 100 parts by weight of the graft ABS polymer. When the content of the imide-substituted copolymer does not lie within the above-described range, heat resistance and mechanical properties are deteriorated.

The content of the additive for improving elongation and impact strength may be 2.5 to 50 parts by weight based on 100 parts by weight. When the content of the additive is less than 2.5 parts by weight, elongation and impact strength are poor. When the content of the additive is greater than 50 parts by weight, heat resistance is poor.

Individual constituents of the thermoplastic resin composition will now be described in greater detail.

Graft ABS Polymer

The graft ABS polymer may be prepared by copolymerizing 10 to 40 parts by weight of a polybutadiene rubber latex of which the average particle diameter is from 800 to 1,500 Å and the gel content is from 80 to 90%; 15 to 30 parts by weight of a polybutadiene rubber latex of which the average particle diameter is from 2,500 to 3,500 Å and the gel content is from 80 to 90%; 15 to 30 parts by weight of an aromatic vinyl compound; and 10 to 25 parts by weight of a vinyl cyanide compound.

When a rubber latex having the average particle diameter of 1,500 Å is used alone, surface gloss is improved, but impact strength is significantly reduced. When a rubber latex having the average particle diameter of 2,500 Å is used alone, impact strength is improved, but surface gloss is significantly reduced. For these reasons, a mixture of polybutadiene rubber latexes having different particle diameters is used. To avoid these disadvantages, maintain properties of individual rubber latexes, and improve tensile strength, it is preferable to use a graft ABS resin prepared by mixing a rubber latex (small particle-sized rubber latex) having an average particle diameter of 800 to 1,500 Å and a rubber latex (large particle-sized rubber latex) having an average particle diameter of 2,500 to 3,500 Å. In this case, the content of the large particle-sized rubber latex may be 37.5 to 300 parts by weight based of 100 parts by weight of the small particle-sized rubber latex. When the content of the large particle-sized rubber latex is less than 37.5 parts by weight, strings are produced. When the content of the large particle-sized rubber latex is greater than 300 parts by weight, flowability is reduced.

A small particle-sized rubber latex is prepared, thereafter a large particle-sized rubber latex is prepared by welding the small particle-sized rubber latex with acid.

The average particle diameter and gel content of the rubber latex used in the preparation of the graft ABS polymer has a very large influence on the impact strength and processability of resin. Generally, as the particle diameter of rubber latex becomes small, the impact resistance and processability is reduced, and as the particle diameter becomes large, the impact resistance improves. Also, as the gel content becomes low, polymerization is carried out in the swelling state of monomers on the inside of the rubber latex, and thus as the apparent particle diameter becomes larger, the impact strength is improved. However, the gel content of the rubber latex is large, and as the particle diameter is large, the graft ratio is falling down. The graft ratio largely affects the property of the polymer. If the graft ratio is reduced, the un-grafted bare rubber latex exists, and thus the thermal stability is deteriorated.

In the present invention, the gel content, swelling index, average particle diameter, and graft ratio are determined as follows.

<Gel Content and Swelling Index>

A rubber latex was solidified with diluted acid or metal salt, and the solidification was washed and dried in a vacuum oven for 24 hrs at 60° C. The obtained rubber mass was cut into small pieces with scissors, and 1 g of the rubber slice was added to 100 g of toluene, and then was stored in a dark room at room temperature for 48 hrs. The resultant was separated to sol and gel, and then the gel content and swelling index were measured according to the following equations:

Gel content (%)=[weight of insoluble part (gel)]/[weight of sample]×100

Swelling index=weight of swelled gel/weight of the gel

<Average Particle Diameter>

It was measured by the dynamic laser-light scattering method using Nicomp (Model: 370 HPL).

<Graft Ratio>

A graft polymer latex is solidified, washed, and dried to obtain powdery polymer. 2 g of the powdery polymer is stirred for 24 hrs with the addition of 300 ml of acetone. The solution is separated using an ultra-centrifuge. Then, the separated acetone solution is dropped on methanol to obtain un-grafted part. The un-grafted part is dried and weighed. The graft ratio is calculated according to the following equation:

Graft ratio (%)=(weight of grafted monomer)/(weight of rubber)×100

Hereinafter, the preparing step of a graft ABS copolymer resin is explained in detail by dividing into a preparation step of a small particle-sized rubber latex, a preparation step of a large particle-sized rubber latex and a graft copolymerization step.

<Preparation of a Small Particle-Sized Rubber Latex>

A small particle-sized rubber latex used in the present invention is a conjugated diene polymer and has preferably an average particle diameter of 800 to 1,500 Å and a gel content of 80 to 90%. When the gel content is greater than 90%, impact strength is reduced. When the gel content is less than 70%, thermal stability is reduced.

A small particle-sized rubber latex is prepared by adding and reacting for 7 to 12 hrs at 50 to 65° C., in a lump 100 parts by weight of a conjugated diene monomer, 1 to 4 parts by weight of a emulsifier, 0.1 to 0.6 part by weight of a polymerization initiator, 0.1 to 1.0 part by weight of an electrolyte, 0.1 to 0.5 part by weight of a molecular weight controlling agent, 90 to 130 parts by weight of de-ionized water in reactor, and then further adding and reacting for 5 to 15 hrs at 55 to 70° C. in a lump 0.05 to 1.2 parts by weight of a molecular weight controlling agent.

The emulsifier is an alkyl aryl sulfonate, an alkalimetal alkyl sulfate, a sulfonated alkyl ester, a soap of fatty acid, an alkali salt of rosinate, etc., which can be used alone or as a mixture of more than two kinds.

The polymerization initiator is an aqueous persulfate, a peroxy compound, a redox compound or a fat-soluble polymerization initiator. The aqueous persulfate is a sodium or potassium persulfate. The fat-soluble polymerization initiator is cumene hydroperoxide, diisopropylbenzene hydroperoxide, azobis-isobutylnitrile, tert-butylhydroperoxide, paramethane hydroperoxide, benzoyl peroxide, etc., which also can be used alone or as a mixture of more than two kinds.

The electrolyte can be used alone or as a mixture of more than two kinds of KCl, NaCl, $KHCO_3$, $NaHCO_3$, $K_2CO_3$, $Na_2CO_3$, $KHSO_3$, $NaHSO_3$, $K_4P_2O_7$, $K_3PO_4$, $Na_3PO_4$, $K_2HPO_4$, and $Na_2HPO4$, etc.

The molecular weight controlling agent may be preferably mercaptan series.

The polymerization temperature is very important to control the gel content and the swelling index of the rubber latex, wherein the selection of initiator should be considered.

<Preparation of the Large Particle-Sized Rubber Latex (Welding the Small Particle-Sized Rubber Latex)>

Generally, since the average particle diameter of the large particle-sized rubber latex provides a high impact property in the thermoplastic resin, the preparation thereof is very important. The required average particle diameter is preferably from 2,500 to 3000 Å in order to satisfy the physical property in the present invention.

The large particle-sized rubber latex is prepared as follows. To 100 parts by weight of a small particle-sized rubber latex, of which a particle diameter is 800 to 1,500 Å, and the gel content is 80 to 90%, is slowly added and stirred 2.5 to 4.5 parts by weight of an acetic acid solution for 1 hour to increase the particle size, and then the large particle-sized rubber latex is prepared through the welding by stopping the agitation so as to have an average particle diameter of 2,500 to 3,000 Å and a gel content of 80 to 90%.

<Graft-Polymerization>

A graft ABS copolymer is prepared by graft-copolymerizing an aromatic vinyl compound and a vinyl cyanide compound to a small particle-sized rubber latex and a large particle-sized rubber latex prepared through the above method.

That is to say, 15 to 40 parts by weight of aromatic vinyl compound, 5 to 20 parts by weight of vinyl cyanide compound, 0.2 to 0.6 part by weight of emulsifier, 0.2 to 0.6 part by weight of the molecular weight controlling agent, and 0.1 to 0.5 part by weight of the polymerization initiator etc. are added to to 40 to 70 parts by weight of the conjugated diene rubber latex and graft-copolymerization is performed to prepare the graft ABS copolymer. When grafting, the polymerization temperature is preferably 45 to 80° C., and the polymerization time is preferably 3 to 5 hrs.

A method of adding each component can be used an addition method in a lump, a multi-step addition method and a continuous addition method. In order to improve the graft ratio and minimize the formation of solid material, the multi-step addition method and the continuously adding method is preferable.

The graft ABS polymer can be prepared by the following method comprising the steps of: (A) adding 40 to 60 parts by weight of a mixture of two polybutadiene rubber latexes; 5 to 10 parts by weight of an aromatic vinyl compound, 5 to 10 parts by weight of a vinyl cyanide compound, 0.1 to 0.5 part by weight of an emulsifier, and 50 to 80 parts by weight of de-ionized water, escalating the temperature of polymerization reactor from 40 to 60° C., and initiating polymerization by adding peroxide initiator and an activating agent accelerating the initiation reaction; (B) polymerizing by adding successively for 2 to 3 hrs an emulsion containing 10 to 15 parts by weight of an aromatic vinyl compound, 10 to 15 parts by weight of a vinyl cyanide compound, 0.5 to 1.5 parts by weight of an emulsifier and 20 to 30 parts by weight of de-ionized water, as escalating slowly the temperature of polymerization reactor from 60 to 70 C, at the point of 50 to 70% of monomer conversion rate, after going on 30 to 60 minutes from the initiation of the above polymerization; (C) adding a peroxide initiator for 2 to 3 hrs continuously as simultaneously adding the emulsion continuously; and (D) adding in a lump an activating agent accelerating the initiation reaction and a peroxide initiator, after adding the above emulsion (B) and the above peroxide initiator (C), and escalating the temperature of polymerization reactor from 70 to 80° C. for 1 to 2 hrs, and completing polymerization.

The content of the aromatic vinyl compound may be 37.5 to 300 parts by weight based on 100 parts by weight of the small particle-sized rubber latex. When the content of the aromatic vinyl compound is less than 37.5 parts by weight, weld strength is poor. When the content of the aromatic vinyl compound is greater than 300 parts by weight, flowability and mechanical properties are reduced.

The content of the vinyl cyanide compound may be 25 to 250 parts by weight based on 100 parts by weight of the small particle-sized rubber latex. When the content of the vinyl cyanide compound does not lie within the above-described range, chemical resistance and impact strength of thermoplastic resin are reduced.

The polymerized latex is coagulated with $H_2SO_4$, $MgSO_4$, $CaCl_2$, or $Al_2(SO_4)_3$, which is widely known, and washed, dehydrated and dried to obtain a powdery polymer.

The aromatic vinyl compound may be selected from the group consisting of styrene, $\alpha$-methyl styrene, $\alpha$-ethyl styrene, $\rho$-methyl styrene. The vinyl cyanide compound is preferably selected from the group consisting of acrylonitrile, methacrylonitrile, and ethacrylonitrile.

The emulsifier used in the polymerization is preferably alkyl aryl sulfonate, alkali methyl alkyl sulfate, sulfonated alkyl ester, soap of fatty acid, alkali salt of rosinate such as potassium rosinate etc., which can be used alone or as a mixture of more than two kinds.

The polymerization initiator may be an inorganic peroxide such as sodium or potassium persulfate, etc.

The activating agent for accelerating the initiation reaction of peroxide may be sodium formaldehyde, sulfoxylate, sodium ethylenediamine tetraacetate, ferrous sulfate, dextrose, sodium pyrrolinate, or sodium sulfite.

The molecular weight controlling agent is mercaptan series, preferably tertiary dodecylmercaptan.

After completing the polymerization, the graft ratio of the ABS polymer may be 30% or more. When the graft ratio is less than 30%, un-grafted bare rubber latex exists, and thus the thermal stability is deteriorated.

α-Methylstyrene Copolymer

The α-methylstyrene copolymer may be prepared by copolymerizing a α-methylstyrene (AMS) monomer and an acrylonitrile (AN) monomer.

Preferably, the α-methylstyrene copolymer may be prepared by copolymerizing 50 to 80 parts by weight of a α-methylstyrene (AMS) monomer and 20 to 50 parts by weight of an acrylonitrile (AN) monomer with a suitable ratio.

The content of the acrylonitrile monomer may be 25 to 100 parts by weight based on 100 parts by weight of the α-methylstyrene (AMS) monomer. When the content of the acrylonitrile monomer does not lie within the above-described range, chemical resistance and impact strength of thermoplastic resin are reduced.

Bulk polymerization is preferable as a polymerization method. 100 Parts by weight of the monomers, 26 to 30 parts by weight of toluene as a solvent and 0.1 to 1.0 part by weight of di-tert-dodecylmercaptan as a molecular weight controlling agent are mixed. The mixture is successively added in a reactor, and reacted for 2 to 4 hrs. At this time, it is preferable that the reaction temperature is maintained at 140 to 170° C.

This preparation process is performed by a continuous process consisting of a pump adding raw material, a continuous agitation bath, a pre-heat bath and an evaporation bath, a polymer carrying pump, and an extrusion processing instrument.

Imide-Substituted Copolymer

The imide-substituted copolymer is prepared by the method of preparing a heat resistant copolymer through continuous bulk polymerization or solution polymerization. That is, an aromatic vinyl monomer and an unsaturated dicarboxylic anhydride are copolymerized to obtain a styrene-maleic anhydride copolymer. Primary amine is added to the styrene-maleic anhydride copolymer to carry out imide substitution, thereby preparing the imide-substituted copolymer.

When preparing the imide-substituted copolymer, unreacted aromatic vinyl monomer, unsaturated dicarboxylic anhydride, solvent, etc. are removed using a seperator after preparing the styrene-maleic anhydride copolymer. This process minimizes addition polymerization of aromatic vinyl monomer and addition reaction of unsaturated dicarboxylic anhydride and primary amine, which can occur in the imide substitution.

(a) Polymerization of Aromatic Vinyl Monomer and Unsaturated Dicarboxylic Anhydride Monomer In the present step, a mixture containing an aromatic vinyl monomer and an initiator and a mixture containing an unsaturated dicarboxylic anhydride monomer and a solvent are individually added to a reactor and polymerization is performed.

The aromatic vinyl monomer may be styrene monomer such as styrene, α-methyl styrene, vinyl toluene, t-butyl styrene, or chloro styrene, or a derivative thereof. Preferably, styrene is used.

The aromatic vinyl monomer is contained preferably in an amount of 20 to 60% by weight in the mixture of the aromatic vinyl monomer and an initiator and the mixture of an unsaturated dicarboxylic anhydride monomer and a solvent, which are a raw material. When the content of the aromatic vinyl monomer is greater than 60% by weight, it is difficult to obtain the final resin with sufficient heat resistance.

The initiator may be organic peroxides or azo compounds. Examples of the organic peroxides include ketone peroxide, peroxy ketal, hyperoxide, dialkyl peroxide, diacryl peroxide, peroxyester, peroxydicarbonate, methyl ethyl ketone peroxide, methyl isobutyl ketone peroxide, methylcyclohexane peroxide, acetylacetone peroxide, 1,1-dibutylperoxy-3,3,5-trimethylcyclohexane, 1,1-dibutylperoxycyclohexane, 2,2-di-butylperoxybutane, 2,2,4-trimethylpentyl-2-hydroperoxide, dicumyl peroxide, 2,5-dimethyl-2,5-di-(t-butyl peroxy) hexane, t-butylcumyl peroxide, di-t-butyl peroxide, tris-(t-butylperoxy)triazine, 1,1-bis(t-butylperoxy)-3,3,5-trimethyl cyclohexane, and di-t-butylperoxyhexahydroterephthalate.

Examples of the azo compound include 1,1-azobis(cyclohexane-1-carbonitrile), azodi-t-octane-2-cyano-2-propylazoformamide, dimethyl-2,2-azobis(2-methylpropinoate), and 2,2-azobis(2-hydroxymethylpropyonitrile).

The content of the initiator in the raw material may be 0.01 to 0.1% by weight. When the content of the initiator is less than 0.01% by weight, polymerization rate is reduced. When the content of the initiator is greater than 0.1% by weight, a desired molecular weight cannot be obtained and controlling heat of reactor is difficult.

Examples of the unsaturated dicarboxylic anhydride monomer include maleic anhydride, imide anhydride, citraconic anhydride and aconito anhydride. Preferably, maleic anhydride is used.

The content of the unsaturated dicarboxylic anhydride monomer in the raw material may be 10 to 30% by weight. When the content of the unsaturated dicarboxylic anhydride monomer is less than 10% by weight, desired heat resistance cannot be obtained.

Examples of the solvent include ketones, dimethyl formamide, and dimethyl sulfoxide. Preferably, methyl ethyl ketone (MEK), cyclohexanone, methylisobutyl ketone (MIBK), or ketones such as acetone is used. More preferably, methyl ethyl ketone, cyclohexanone, or a mixture thereof is used.

The content of the solvent in the raw material may be 20 to 60% by weight. When the content of the solvent is less than 20% by weight, the total content of monomers, i.e., the unsaturated dicarboxylic monomer+the aromatic vinyl compound is too high with respect to the amount of the solvent, and thus the viscosity of polymer mixture significantly increases during the reaction process and controlling reaction heat is difficult, which can cause problems during reaction process. When the content of the solvent is greater than 60% by weight, the amount of the solvent is too high with respect to the total amount of monomers, the molecular weight of resin becomes small and the separation efficiency of the solvent and unreacted monomers in a separator is reduced.

The raw material is added to a series of one or more reactors and a polymerization process is performed. Since the aromatic vinyl monomer and the unsaturated dicarboxylic anhydride monomer undergo polymerization even at room temperature, it is preferable that they are individually added to a reactor.

The individual addition can be performed using a conventional method, but a mixture of the aromatic vinyl monomer and the initiator and the mixture of the unsaturated dicarboxylic anhydride monomer and the solvent may be separately prepared and added to a reactor.

Examples of the reactor useful in the present invention include a continuous stirred tank reactor (CSTR), a plug flow reactor, and a multi-stage reactor. Preferably, a continuous stirred tank reactor is used.

The polymerization is carried out preferably at 60 to 170° C., more preferably at 80 to 150° C., most preferably 90 to 130° C. When the polymerization temperature is lower than 60° C., desired polymerization rate cannot be acquired. When the polymerization temperature is higher than 170° C., a desired molecular weight cannot be obtained.

The styrene-maleic anhydride copolymer obtained in this step is preferably 90% by weight, more preferably at least 95% by weight in the polymerization rate of the unsaturated dicarboxylic anhydride monomer.

b) Removal of Unreacted Monomers

In the present step, the polymer prepared in the step a) is continuously supplied to a separator connected to the reactor to remove unreacted monomers and the solvent. That is, the solution polymerized in the step (a) is continuously supplied to a separator to remove volatile components such as unreacted aromatic vinyl monomer, unreacted unsaturated dicarboxylic anhydride monomer, and the solvent.

Examples of the separator useful in the present invention include a flash evaporator, a falling strand devolatilizer, a thin film evaporator, and a vented extruder. In particular, a falling strand devolatilizer is preferable in applying to this invention. When separating unreacted monomers and the solvent in the falling strand devolatilizer, driving conditions are preferably a temperature of 150 to 300° C. and a pressure of 20 to 200 torr, more preferably a temperature of 170 to 250° C. and a pressure of 30 to 100 torr.

The content of unreacted monomers and the solvent removed in the separator is preferably at least 85% by weight, more preferably at least 90% by weight of the content thereof before being added to the separator.

This step minimizes addition polymerization of the aromatic vinyl monomer and addition reaction of the unsaturated dicarboxylic anhydride and primary amine, which can occur during imide substitution reaction, and thus the final product contains no impurities and heat resistance can be improved.

c) Imide Substitution Reaction

In the present step, a mixture containing the copolymer melt, from which unreacted monomers and the solvent are removed, primary amine, active catalyst for imide substitution reaction, and a solvent is continuously supplied to a reactor which is connected to the separator of the step b) to induce imide substitution reaction.

Examples of the primary amine include methyl amine, ethyl amine, propyl amine, butyl amine, hexyl amine, cyclohexyl amine, decyl amine, aniline, toluidine, chlorophenyl amine, and bromophenyl amine. Preferably, aniline is used.

The primary amine may be used in an amount of 0.5 to 2.0 mol % with respect to the amount of the unsaturated dicarboxylic anhydride in the copolymer melt added to the separator. When the amount of the primary amine is less than 0.5 mol %, thermal stability and processibility of polymer are reduced. When the amount of the primary amine is greater than 2.0 mol %, it is difficult to remove unreacted primary amine residue and color of resin is changed.

The amount of the primary amine in the mixture of the primary amine, the active catalyst for imide substitution reaction, and the solvent may be 10 to 40% by weight.

Examples of the active catalyst for imide substitution reaction include tertiary amine such as trimethylamine, triethylamine, and tributylamine.

The content of the active catalyst for imide substitution reaction is 10% by weight or less with respect to the primary amine. When the content of the active catalyst for imide substitution reaction is greater than 10% by weight, the efficiency of Imide substitution reaction is increased no longer.

The solvent may be the same as that used in the above step a). The amount of the solvent may be 0.5 to 1.5 times of the amount of the resin (the copolymer melt from which unreacted monomers and solvent are removed) introduced to the imide substitution reaction. When the content of the solvent is less than 0.5 times of the amount of the resin introduced to the imide substitution reaction, the viscosity is high, and thus the efficiency of the imide substitution reaction is reduced and it is difficult to perform process. When the amount of the solvent is greater than 1.5 times of the amount of the resin introduced to the imide substitution reaction, it is a burden on a volatilization process which will subsequently be performed.

The mixture containing the copolymer melt, the primary amine, the active catalyst for imide substitution reaction, and the solvent, which is discharged through the separator of the above step b), is added to a reactor after homogeneously mixing and thoroughly dissolving.

The imide substitution reaction is carried out in a series of one or more reactors. The reactor may be a continuous stirred tank reactor (CSTR), a plug flow reactor, or a multistage reactor.

The imide substitution reaction is carried out preferably at 100 to 250° C., more preferably at 120 to 200° C., most preferably 130 to 170°. When the reaction temperature is lower than 100° C., a desired reaction rate cannot be obtained. When the reaction temperature is higher than 250° C., the primary amine may be decomposed.

The resulting maleimide-based copolymer is preferably at least 70 mol %, more preferably at least 85 mol %, most preferably at least 90 mol % in a reaction yield of the primary amine. When the reaction yield of the primary amine is less than 70 mol %, heat resistance and thermal stability of the maleimide-based copolymer are poor.

The resulting imide-substituted copolymer may have an aromatic vinyl homopolymer (polystyrene) content of 3% by weight or less. When the aromatic vinyl homopolymer is greater than 3% by weight, heat resistance of resin is reduced and mechanical properties are deteriorated.

The imide-substituted copolymer prepared according to the method of the present invention can have significantly improved heat resistance, a high reaction efficiency such as a polymerization conversion ratio of 90% or more, and a uniform composition without impurities in the final product by minimizing addition polymerization of the aromatic vinyl monomer and addition reaction of the unsaturated dicarboxylic anhydride and the primary amine, which can occur in the imide substitution reaction.

The imide copolymer resin prepared by the above method has an aromatic vinyl homopolymer (polystyrene) content of 3% by weight or less, and excellent heat resistance such as a glass transition temperature (Tg) of 170 to 190° C. Also, the imide-based copolymer resin has high efficiency of imide substitution reaction such as a polymerization conversion ratio of 90% or more and excellent heat resistance, weather resistance, and mechanical properties.

Additive for Improving Elongation and Impact Strength

The additive for improving elongation and impact strength is a polymethylmethacrylate (PMMA) copolymer, a copolymer of styrene and maleic anhydride, or a copolymer of α-methylstyrene copolymer and maleic anhydride.

The PMMA copolymer may be selected from the group consisting of a graft copolymer of methylmethacrylate and glycidyl methacrylate (PMMA-g-GMA), a graft copolymer of methylmethacrylate and maleic anhydride (PMMA-g-MAH), a graft copolymer of methylmethacrylate and ethyl acrylate (PMMA-g-EA), and a graft copolymer of methylmethacrylate and vinyl acetate (PMMA-g-VA). The content of methylmethacrylate in polymethylmethacrylate (PMMA) copolymer may be 20 to 80% by weight.

Also, the content of styrene in the copolymer of styrene and maleic anhydride may be 20 to 97% by weight and the content of α-methylstyrene copolymer in the copolymer of α-methylstyrene copolymer and maleic anhydride may be 20 to 97% by weight.

The additive intereacts with constituents of the heat resistant ABS, i.e., the imide-substituted copolymer and α-methylstyrene copolymer to improve elongation and impact strength.

Also, a thermoplastic resin composition according to another embodiment of the present invention includes a graft ABS polymer, a α-methylstyrene copolymer, and an additive for improving wettability. The thermoplastic resin composition has excellent weld strength and wettability, which are important properties in a postprocessing step and maintains other physical properties.

The thermoplastic resin composition may include 20 to 40 parts by weight of a graft ABS polymer; 20 to 80 parts by weight of an α-methylstyrene copolymer; and 0.1 to 5 parts by weight of an additive for improving wettability.

The content of the α-methylstyrene copolymer may be 50 to 400 parts by weight based on 100 parts by weight of the graft ABS polymer. When the content of the α-methylstyrene copolymer is less than 50 parts by weight, impact strength, elongation, or chemical resistance are poor. When the content of the α-methylstyrene copolymer is greater than 400 parts by weight, tensile strength, heat resistance, flowability, and gloss are poor.

The content of the additive for improving wettability is preferably 0.25 to 25 parts by weight, more preferably 2.5 to 15 parts by weight based on 100 parts by weight of the graft ABS polymer. When the content of the additive for improving wettability is less than 0.25 part by weight, wettability is insufficiently improved. When the content of the additive for improving wettability is greater than 25 parts by weight, heat resistance and thermal stability are reduced.

The graft ABS polymer and the α-methylstyrene copolymer are as described above.

Hereinafter, the additive for improving wettability will be described in detail.

The additive for improving wettability is based on glycol and modifies the surface of resin to improve a degree at which a paint spreads on a heat resistant ABS surface in a postprocessing process, in particular, a painting process after injection molding the thermoplastic resin composition, i.e., wettability. As a result, the number of painting for obtaining desirable coloration in the painting process can be decreased, and thus postprocessing time and costs can be reduced.

The effects by the additive for improving wettability can be obtained by increasing the force of a hydroxyl group in the additive to attract a chemical solvent in a resin surface by chemical interaction between the hydroxyl group and the chemical solvent. The additive is generally in a liquid phase, but becomes in a solid phase when the molecular weight of the additive increases.

The additive for improving wettability may be at least one selected from the group consisting of polypropyleneglycol, polyethylene glycol or a block copolymer thereof (polypropylene glycol/polyethylene glycol).

The additive for improving wettability has a weight average molecular weight of 500 to 5,000, preferably 1,000 to 4,000. When the weight average molecular weight of the additive is less than 500, the effect of improving wettability is not obtained. When the weight average molecular weight of the additive is greater than 5,000, miscibility and flowability are reduced.

In an embodiment of the present invention, the thermoplastic resin composition may further include an imide-substituted copolymer and an additive for improving elongation and impact strength.

Preferably, the thermoplastic resin composition may include 20 to 40 parts by weight of a graft ABS polymer; 20 to 40 parts by weight of an α-methylstyrene copolymer; 10 to 30 parts by weight of an imide-substituted copolymer; 1 to 10 parts by weight of an additive for improving elongation and impact strength; and 0.1 to 5 parts by weight of an additive for improving wettability.

The thermoplastic resin composition may further include at least one additive selected from the group consisting of an antioxidant, a stabilizer, and a lubricant, if necessary.

The antioxidant prevents oxidation which can occur during mixing, extrusion and injection molding processes in the preparation of the thermoplastic resin composition. Examples of the antioxidant useful in the present invention include a phenol-based primary antioxidant that acts as a chain terminator and a phosphite-based secondary antioxidant that acts as a peroxide decomposer.

The content of the antioxidant may be 0.1 to 5 parts by weight based on 100 parts by weight of the thermoplastic resin composition. The content of the antioxidant is less than 0.1 part by weight, the improvement of thermal stability is limited. When the content of the antioxidant is greater than 5 parts by weight, the antioxidant is decomposed, and thus thermal stability is rather deteriorated and only manufacturing costs increases.

The lubricant makes the surface of a final product prepared from the resin composition smooth to improve processibility. In the present invention, an external lubricant and an internal lubricant can be selectively used. The internal lubricant exist inside polymer to reduce the viscosity of resin itself, thereby improving flowability. The external lubricant reduces extrusion load between the polymer melt and metal surface in an extruder. A stearamide-based lubricant may be used in the present invention.

The content of the lubricant is 0.1 to 10 parts by weight, preferably 0.5 to 5 parts by weight, based on 100 parts by weight of the thermoplastic resin composition. When the content of the lubricant introduced is less than 0.1 part by weight, it is difficult to uniformly disperse rubber particles in the resin composition during an extrusion process and releasing effect of mold is deteriorated during an injection molding process, resulting in release cracks or pin whitening, which deteriorates values of products. When the content of the lubricant is greater than 10 parts by weight, uniform dispersion of rubber particles and improvement of flowability and impact resistance can be expected, but heat resistance is reduced.

The stabilizer suppresses or prevents thermal decomposition of plastics. Examples of the stabilizer useful in the present invention include phosphite-based materials and stearate-based materials. The content of the stabilizer is 0.1 to 5 parts by weight, preferably 0.1 to 2 parts by weight, based on 100 parts by weight of the thermoplastic resin composition. When the content of the stabilizer is less than 0.1 part by weight, thermal decomposition is not efficiently prevented. When the content of the stabilizer is greater than 5 parts by weight, the stabilizer decomposes itself, and thus thermal stability is rather deteriorated.

A method of preparing the thermoplastic resin composition of the present invention is not particularly restricted and a conventional method can be used. The thermoplastic resin composition can be prepared by mixing the graft ABS polymer, the α-methylstyrene copolymer, and other additives. The thermoplastic resin composition can be extrusion molded using a conventional method so as to be widely utilized as various parts of automobiles and electronic/electric products.

Hereinafter, the present invention is described in more detail through the following examples. However, the scope of the present invention is not limited to the following examples.

Molding conditions and physical property evaluation conditions used in the present invention are as follows.

(1) Extrusion condition: LEISTRITZ MICRO 27 GL-36D, 240 to 260° C.

(2) Injection molding: ENGEL EC100 (80 TON), 240 to 260° C.

(3) Heat deflection temperature (HDT): ASTM D-648

(4) Chemical resistance (ESCR): An injected specimen was applied to strain of 1.3% in a cold chamber maintained at −20° C., and then left for 30 min. After applying a thinner (037u), generation of cracks was observed for 20 min. The observation results are represented as follows: very good—A, good—B, fair—C, poor—D, very poor—E.

(5) Weld strength: A constant pressure of 20 bar was applied to a hot plate at 350° C. for 10 sec, and then the length (cm) of string generated when an injected specimen was separated from the hot plate was measured.

(6) Elongation: ASTM D-638

(7) Impact strength: ASTM D-256

(8) Contact angle: To evaluate wettability, a resin was left at room temperature for 24 hr or more, and then the contact angle between the resin and each of water as a polar solvent and diiodomethane as a non-polar solvent was measured. Generally, when a resin surface has an affinity for a chemical solvent, the contact angle is low.

PREPARATION EXAMPLE 1

Preparation of Graft ABS Polymer

1) Preparation of a Small Particle-Sized Rubber Latex 100 parts by weight of de-ionized water, 100 parts by weight of 1,3-butadiene as a monomer, 1.2 parts by weight of potassium rosinate as an emulsifier, 1.5 parts by weight of potassium oleate, 0.1 part by weight of sodium carbonate ($Na_2CO_3$) as an electrolyte, 0.5 part by weight of $KHCO_3$, and 0.3 part by weight of tert-dodecyl mercaptan (TDDM) as a molecular weight controlling agent were introduced in a lump to a nitrogen-substituted polymerization reactor (autoclave). The reaction temperature was raised to 55° C., and then the reaction was initiated by adding in a lump 0.3 part by weight of potassium persulfate as an initiator in the reactor, and reacted for 10 hrs. Thereafter, 0.05 parts by weight of tert-dodecyl mercaptan (TDDM) was further added to the reactant, and then the temperature is raised to 65 C, and reacted for 8 hrs. to obtain the small particle-sized rubber latex.

The obtained rubber latex had a gel content of 90%, a swelling index of 18, and a particle diameter of 1,000 Å.

2) Preparation of a Large Particle-Sized Rubber Latex (Welding Process of the Small Particle-Sized Rubber Latex)

100 parts by weight of the small particle-sized rubber latex prepared above, was added in the reactor, and the stirring speed was controlled to 10 rpm, and the temperature was controlled to 30° C., and then 3.0 parts by weight of a 7% aqueous acetic acid solution was slowly added in the reactor for 1 hr. Thereafter, the agitation was stopped, and the conjugated diene latex having a large diameter was prepared through welding of the small particle-sized rubber latex by leaving the resultant for 30 min. The obtained large particle-sized rubber latex was analyzed in the same method as the small particle-sized rubber latex.

The particle diameter of the large particle-sized rubber latex was 3,000 Å, and the gel content thereof was 90%, and the swelling index thereof was 17.

3) Grafting Step (Preparation of a Graft ABS Copolymer):

60 parts by weight of the large particle-sized rubber latex prepared above, 65 parts by weight of de-ionized water, 0.35 part by weight of potassium rosinate as an emulsifier, 0.1 part by weight of sodium ethylene diaminetetraacetate, 0.005 part by weight of ferrous sulfate, and 0.23 part by weight of formaldehyde sodium sulfoxylate were introduced in a lump to a nitrogen-substituted polymerization reactor, and the temperature was raised to 70 C.

The mixed emulsion solution, composed of 40 parts by weight of de-ionized water, 0.5 part by weight of potassium rosinate, 19.2 parts by weight of styrene, 8.2 parts by weight of acrylonitrile, 0.3 part by weight of tert-dodecylmercaptan, and 0.3 part by weight of diisopropylenehydroperoxide, was continuously added to the reactant for 2 hrs. Thereafter, the mixed emulsion solution, composed of 10 parts by weight of de-ionized water, 0.1 part by weight of potassium rosinate, 9.6 parts by weight of styrene, 3.0 parts by weight of acrylonitrile, 0.1 part by weight of tert-dodecylmercaptan, and 0.1 part by weight of diisopropylenehydroperoxide, was continuously added to the reactant for 1 hr. and the temperature was raised to 80° C., and then the reaction was completed by aging for 1 hr.

Wherein, the copolymerization conversion ratio was 97.5%, and the solid type solidification part was 0.2%, and the graft ratio was 37%.

This latex was solidified with an aqueous solution of sulfuric acid, and washed, thereafter the powder was obtained.

PREPARATION EXAMPLE 2

Preparation of α-methylstyrene Copolymer

A mixture of 70 parts by weight of α-methyl styrene, 30 parts by weight of acrylonitrile, 30 parts by weight of toluene as solvent and 0.15 parts by weight of di-tert-dodecylmercaptan as the molecular weight controlling agent were continuously introduced to the reactor, wherein the reaction time was set to 3 hrs, and the reaction temperature was maintained at 148° C. The discharged polymerization solution from the reactor was heated in a preheater, and the un-reacted monomer was volatilized in evaporation reactor, and then the temperature of the polymer was maintained at 210° C. Thereafter, the acrylonitirile-styrene copolymer (SAN type copolymer) was processed in a pellet form by using an extruder having a transfer pump.

PREPARATION EXAMPLE 3

Imide-Substituted Copolymer

Preparation of the imide-substituted copolymer was carried out in a reactor composed of three tanks for mixing raw materials, three tanks for introducing monomers, and two vertical cylindrical reactors, which were arrayed in series.

(First Process)

A mixture of 38.2% by weight of styrene, 0.01% by weight of 1,1-bis(t-butylperoxy)-3,3,5-trimethyl cyclohexane as a multifunctional initiator, and 0.2% by weight of α-methylstyrene dimmer was introduced into a first tank for mixing raw material and a mixture of 16.4% by weight of maleic anhydride, 16.4% by weight of methylethylketone, and 29.1% by weight of cyclohexanone was introduced into a second tank for mixing raw material. Thereafter, raw materials were introduced into a first reactor from the respective tanks for mixing raw material at a constant flow rate and polymerized. The polymerized solution was continuously introduced into the separator, in which the polymerization conversion ratio thereof was set to 70% by weight or more. At this time, the temperature of the first reactor was maintained at 120° C.

(Second Process)

The polymerized solution from the first reactor was introduced into a falling strand devolatilizer and un-reacted monomers and the solvent were removed at 180° C. and 250 torr.

(Third Process)

Next, a mixture containing aniline of the same mol as that of maleic anhydride used in the first process, triethylamine of 3/100 times the amount of the aniline, and a mixed solvent of methyl ethyl ketone and cyclohexanone of 5 times the amount of the aniline was to the polymerized solution discharged from the separator in a second reactor and imide substitution reaction was carried out to obtain the copolymer resin. At this time, the temperature of the second reactor was maintained at 140° C.

EXAMPLE 1

30 parts by weight of graft ABS polymer prepared in Preparation Example 1, 70 parts by weight of α-methylstyrene copolymer prepared in Preparation Example 2, 5 parts by weight of PMMA-g-GMA (poly(methyl methacrylate)-g-glycidyl methacrylate, PMMA:GMA=30% by weight:70% by weight) as an additive for improving elongation and impact strength, 1.0 part by weight of H-WAX 200P (polyethylene wax) as a lubricant, 0.2 part by weight of diphenyl isododecyl phosphate as a stabilizer and 0.2 part by weight of di-t-butyl phenyl phosphate as an antioxidant were mixed. Then, a pellet was prepared by using a twin screw extruder at 240° C.

EXAMPLE 2

A pellet was prepared in the same manner as in Example 1, except that 5 parts by weight of PMMA-g-MAH (poly(methyl methacrylate)-g-maleic anhydride, PMMA:MAH=30% by weight:70% by weight) was used as an additive for improving elongation and impact strength.

EXAMPLE 3

A pellet was prepared in the same manner as in Example 1, except that 5 parts by weight of AMSAN-MAH (α-methylstyreneacrylonitrile- -g-maleic anhydride, AMSAN:MAH=90% by weight:10% by weight), which was prepared by reacting and extruding α-methylstyrene copolymer and maleic anhydride, was used as an additive for improving elongation and impact strength.

COMPARATIVE EXAMPLE 1

30 parts by weight of graft ABS polymer prepared in Preparation Example 1, 40 parts by weight of α-methylstyrene copolymer prepared in Preparation Example 2, 30 parts by weight of the imide-substituted copolymer prepared in Preparation Example 3, 1.0 part by weight of H-WAX 200P (polyethylene wax) as a lubricant, 0.2 part by weight of diphenyl isododecyl phosphate as a stabilizer and 0.2 part by weight of di-t-butyl phenyl phosphate as an antioxidant were mixed. Then, a pellet was prepared by using a twin screw extruder at 240° C.

COMPARATIVE EXAMPLE 2

30 parts by weight of ABS polymer (DP215) available from LG Chem., 40 parts by weight of α-methylstyrene copolymer prepared in Preparation Example 2, 30 parts by weight of the imide-substituted copolymer prepared in Preparation Example 3, 1.0 part by weight of H-WAX 200P (polyethylene wax) as a lubricant, 0.2 part by weight of diphenyl isododecyl phosphate as a stabilizer, and 0.2 part by weight of di-t-butyl phenyl phosphate as an antioxidant were mixed. Then, a pellet was prepared by using a twin screw extruder at 240° C.

COMPARATIVE EXAMPLE 3

30 parts by weight of graft ABS polymer prepared in Preparation Example 1, 40 parts by weight of α-methylstyrene copolymer prepared in Preparation Example 2, 30 parts by weight of N-phenylmaleimide (DENKA-IP (MS-NB), DENKA, Japan) as a heat resistance enhancer, 1.0 part by weight of H-WAX 200P (polyethylene wax) as a lubricant, 0.2 part by weight of diphenyl isododecyl phosphate as a stabilizer and 0.2 part by weight of di-t-butyl phenyl phosphate as an antioxidant were mixed. Then, a pellet was prepared by using a twin screw extruder at 240° C.

The pellets prepared in Examples 1-3 and Comparative Examples 1-3 were injected again at 240° C. and heat deflection temperature, weld strength, elongation, impact strength, and chemical resistance were measured. The results are shown in Table 1.

TABLE 1

|  | Example 1 | Example 2 | Example 3 | Comparative Example 1 | Comparative Example 2 | Comparative Example 3 |
|---|---|---|---|---|---|---|
| Heat deflection temperature (° C., ¼") | 115.5 | 115.8 | 115.9 | 115.4 | 115.3 | 115.9 |
| Weld strength (cm) | 0.0 | 0.0 | 0.0 | 0.0 | 7.0 | 0.0 |
| Elongation (%) | 25 | 22 | 15 | 13 | 20 | 10 |
| Impact strength (J/m, ⅛") | 110 | 108 | 100 | 98 | 98 | 90 |
| Chemical resistance (ESCR) | A | A | B | B | D | D |

As can be seen from Table 1, the thermoplastic resin compositions of examples 1-3 according to the present invention are excellent in impact strength, weld strength, and chemical resistance compared to Comparative Examples 1-3.

EXAMPLE 4

30 parts by weight of graft ABS polymer prepared in Preparation Example 1, 40 parts by weight of α-methylstyrene copolymer prepared in Preparation Example 2, 1 part by weight of polypropyleneglycol, of which the weight average molecular weight was 2,000, as an additive for improving wettability, 1.0 part by weight of H-WAX 200P (polyethylene wax) as a lubricant, 0.2 part by weight of diphenyl isododecyl phosphate as a stabilizer and 0.2 part by weight of di-t-butyl phenyl phosphate as an antioxidant were mixed. Then, a pellet was prepared by using a twin screw extruder at 240° C.

EXAMPLE 5

A pellet was prepared in the same manner as in Example 4, except that polypropyleneglycol, of which the weight average molecular weight was 3,500, was further included as an additive for improving wettability.

COMPARATIVE EXAMPLE 4

A pellet was prepared in the same manner as in Example 4, except that polypropyleneglycol, of which the weight average molecular weight was 425, was further included as an additive for improving wettability.

The pellets prepared in Examples 4 and 5 and Comparative Example 4 were injected again at 240° C. and heat deflection temperature, weld strength, elongation, impact strength, chemical resistance, and contact angle were measured. The results are shown in Table 2.

TABLE 2

|  | Example 4 | Example 5 | Comparative Example 1 | Comparative Example 4 |
|---|---|---|---|---|
| Heat deflection temperature (° C., ¼") | 115.5 | 115.8 | 115.4 | 115.0 |
| Weld strength (cm) | 0.0 | 0.0 | 0.0 | 0.1 |
| Elongation (%) | 25 | 25 | 13 | 25 |
| Impact strength (J/m, ⅛") | 110 | 106 | 98 | 109 |
| Chemical resistance (ESCR) | A | A | B | A |
| Contact angle (°) (diiodomethane) | 9.4 | 8.2 | 29.7 | 30.0 |

As can be seen from Table 2, the thermoplastic resin compositions of Examples 4 and 5 including the additive for improving wettability according to the present invention have improved impact strength, weld strength, and chemical resistance and reduced contact angle, compared to Comparative Examples 1 and 4.

Thermoplastic resin according to the present invention is excellent in weld strength, chemical resistance, impact strength, elongation, and wettability, as well as heat resistance.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A thermoplastic resin composition comprising a graft ABS polymer, a α-methylstyrene copolymer, and an additive for improving wettability over diiodomethane,
    wherein the additive for improving wettability is at least one selected from the group consisting of polypropyleneglycol, polyethyleneglycol, and a block copolymer thereof.

2. The thermoplastic resin composition of claim 1, comprising 20 to 40 parts by weight of a graft ABS polymer; 20 to 80 parts by weight of a α-methylstyrene copolymer; and 0.1 to 5 parts by weight of an additive for improving wettability.

3. The thermoplastic resin composition of claim 1, wherein the graft ABS polymer is prepared by copolymerizing
    10 to 40 parts by weight of a polybutadiene rubber latex (small particle-sized rubber latex) of which the average particle diameter is from 800 to 1,500 Å and the gel content is from 80 to 90%;
    15 to 30 parts by weight of a polybutadiene rubber latex (large particle-sized rubber latex) of which the average particle diameter is from 2,500 to 3,500 Å and the gel content is from 80 to 90%;
    15 to 30 parts by weight of aromatic vinyl compound; and
    10 to 25 parts by weight of vinyl cyanide compound.

4. The thermoplastic resin composition of claim 3, wherein the aromatic vinyl compound is selected from the group consisting of styrene, α-methylstyrene, and ρ-vinyltoluene.

5. The thermoplastic resin composition of claim 3, wherein the vinyl cyanide compound is selected from the group consisting of acrylonitrile, methacrylonitrile, and ethacrylonitrile.

6. The thermoplastic resin composition of claim 1, wherein the α-methylstyrene is prepared by copolymerizing α-methylstyrene and acrylonitrile.

7. The thermoplastic resin composition of claim 1, wherein the α-methylstyrene is prepared by copolymerizing 50 to 80 parts by weight of α-methylstyrene and 20 to 50 parts by weight of acrylonitrile.

8. The thermoplastic resin composition of claim 1, wherein the additive for improving wettability over diiodomethane has a weight average molecular weight of 500 to 5,000.

9. The thermoplastic resin composition of claim 1, further comprising an imide-substituted copolymer and an additive for improving elongation and impact strength.

10. The thermoplastic resin composition of claim 2, further comprising 10 to 30 parts by weight of an imide-substituted copolymer and 1 to 10 parts by weight of an additive for improving elongation and impact strength.

11. The thermoplastic resin composition of claim 10, comprising 20 to 40 parts by weight of a graft ABS polymer; 20 to 40 parts by weight of an α-methylstyrene copolymer; 10 to 30 parts by weight of an imide-substituted copolymer; 1 to 10 parts by weight of an additive for improving elongation and impact strength; and 0.1 to 5 parts by weight of an additive for improving wettability.

12. The thermoplastic resin composition of claim 1, further comprising at least one additive selected from the group consisting of an antioxidant, a stabilizer, and a lubricant.

13. The thermoplastic resin composition of claim 12, wherein the content of an antioxidant is 0.1 to 5 parts by weight, the content of a stabilizer is 0.1 to 5 parts by weight, and the content of a lubricant is 0.1 to 10 parts by weight, based on 100 parts by weight of the thermoplastic resin composition.

* * * * *